US008537284B2

United States Patent
Ma et al.

(10) Patent No.: US 8,537,284 B2
(45) Date of Patent: Sep. 17, 2013

(54) ADJACENT CHANNEL POWER SCAN

(75) Inventors: Xiaoqiang Ma, Streamwood, IL (US);
Azzedine Touzni, Algonquin, IL (US);
Jason Adams, Chicago, IL (US); David Lewis, Schaumburg, IL (US); Louis Giannini, Chicago, IL (US); Feng Huang, Hoffman Estates, IL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 594 days.

(21) Appl. No.: 12/408,150

(22) Filed: Mar. 20, 2009

(65) Prior Publication Data

US 2010/0238358 A1    Sep. 23, 2010

(51) Int. Cl.
*H04N 5/00* (2011.01)
*H04N 5/63* (2006.01)
*H04N 5/44* (2011.01)

(52) U.S. Cl.
USPC ........... 348/725; 348/607; 348/730; 455/63.1

(58) Field of Classification Search
USPC .................. 348/21, 470, 572, 607, 614, 618, 348/725
See application file for complete search history.

(56) References Cited

U.S. PATENT DOCUMENTS

| | | | | |
|---|---|---|---|---|
| 5,389,927 A * | 2/1995 | Turney et al. | ................. | 341/139 |
| 6,049,361 A * | 4/2000 | Kim | ................. | 348/678 |
| 6,127,966 A * | 10/2000 | Erhage | ................. | 342/174 |
| 6,181,921 B1 * | 1/2001 | Konisi et al. | ................. | 455/186.2 |
| 6,226,049 B1 * | 5/2001 | Oh | ................. | 348/607 |
| 6,340,997 B1 * | 1/2002 | Borseth | ................. | 348/731 |
| 6,389,070 B1 * | 5/2002 | Cugnini et al. | ................. | 375/232 |
| 6,751,083 B1 * | 6/2004 | Gleiter et al. | ................. | 361/434 |
| 6,775,336 B1 * | 8/2004 | Takaki | ................. | 375/345 |
| 6,882,693 B2 * | 4/2005 | Ozeki et al. | ................. | 375/345 |
| 6,970,523 B2 * | 11/2005 | Strolle et al. | ................. | 375/345 |
| 6,977,978 B1 * | 12/2005 | Jakobsson | ................. | 375/350 |
| 7,158,190 B2 * | 1/2007 | Ikeguchi | ................. | 348/731 |
| 7,292,830 B1 * | 11/2007 | Cheung et al. | ................. | 455/136 |
| 7,373,126 B2 * | 5/2008 | Narita | ................. | 455/234.1 |
| 7,508,458 B2 * | 3/2009 | Matsuo | ................. | 348/725 |
| 7,561,213 B2 * | 7/2009 | Okamoto | ................. | 348/725 |
| 7,653,368 B2 * | 1/2010 | Ashkenazi | ................. | 455/234.1 |
| 7,710,503 B2 * | 5/2010 | Pugel et al. | ................. | 348/731 |
| 7,755,523 B2 * | 7/2010 | Hwang et al. | ................. | 341/139 |
| 7,791,515 B2 * | 9/2010 | Fifield | ................. | 341/143 |
| 7,881,411 B2 * | 2/2011 | Sutton | ................. | 375/345 |
| 7,929,650 B2 * | 4/2011 | Sobchak et al. | ................. | 375/345 |
| 7,952,648 B2 * | 5/2011 | Yamamoto et al. | ................. | 348/731 |
| 8,031,103 B2 * | 10/2011 | Chen et al. | ................. | 341/166 |
| 8,036,618 B2 * | 10/2011 | Zeng | ................. | 455/234.1 |
| 8,294,830 B2 * | 10/2012 | Furutani | ................. | 348/732 |
| 2003/0038897 A1 * | 2/2003 | Shiotsu | ................. | 348/725 |
| 2003/0091132 A1 * | 5/2003 | Anderson | ................. | 375/345 |
| 2003/0228857 A1 * | 12/2003 | Maeki | ................. | 455/278.1 |
| 2004/0036637 A1 * | 2/2004 | Singvall et al. | ................. | 341/138 |
| 2005/0047534 A1 * | 3/2005 | Lindoff et al. | ................. | 375/345 |
| 2006/0222116 A1 * | 10/2006 | Hughes et al. | ................. | 375/345 |
| 2007/0086547 A1 * | 4/2007 | Sobchak et al. | ................. | 375/345 |

(Continued)

*Primary Examiner* — Brian Yenke
(74) *Attorney, Agent, or Firm* — Volpe and Koenig, P.C.

(57) ABSTRACT

A method and apparatus are disclosed for determining the presence of adjacent channel interference. Received digital signals are processed to detect the existence of strong channels adjacent to the channel of interest and control signals may be generated based on the detection of strong adjacent channels. The control signals are then used to adjust the signal power of the received signals.

16 Claims, 5 Drawing Sheets

(56) References Cited

U.S. PATENT DOCUMENTS

| | | | |
|---|---|---|---|
| 2007/0165755 A1* | 7/2007 | Jong | 375/346 |
| 2007/0258548 A1* | 11/2007 | Sutton | 375/345 |
| 2007/0291880 A1* | 12/2007 | Ashkenazi | 375/345 |
| 2009/0079611 A1* | 3/2009 | Hwang et al. | 341/155 |
| 2009/0135971 A1* | 5/2009 | Takatz et al. | 375/345 |
| 2010/0062736 A1* | 3/2010 | Zeng | 455/234.1 |
| 2010/0235707 A1* | 9/2010 | Su et al. | 714/752 |

* cited by examiner

ADJACENT CHANNEL POWER SCAN

FIELD OF INVENTION

This application is related to wireless communications.

BACKGROUND

Adjacent signal interference is one of the major sources of noise in digital TV signals. For example, TV signals, including analog and digital signals, occupy certain frequencies in UHF bands. In Europe, each DVB-T/H and PAL/SECAM channel occupies 8 MHz in UHF band. As those having skill in the art know, there is no guard band between these channels. Thus, in some areas, interference TV signals are closer than the desired TV signals, resulting in adjacent interference being present when receiving the desired TV signals. Accordingly, achieving good signal quality in the presence of adjacent interference is a challenging issue in designing DVBT/H receivers.

A common solution for suppressing adjacent interference is adding a low pass filter (LPF) to filter out the interference. However, the quality of the signal going into the LPF determines the final receiver performance. The signal quality before the LPF depends on the tuner, automatic gain control (AGC) and an analog-to-digital converter (AD C). Additionally, some tuners need to be configured differently in order to deal with different adjacent interference, e.g., N±1, N±2, etc.

One solution used for adjacent interference detection is to measure signal power before and after the LPF. If the signal power before the LPF is much larger than the signal power after the LPF, it can be determined that the adjacent interference is present, e.g., for N±1 interference. However, the signal power difference before and after the LPF behaves differently with adjacent interference at different locations with respect to the desired signal, (e.g., N±m, where m>1 interference). Thus, adjacent interference detection, and determining its location are important for adjusting the tuner, the AGC and the ADC to obtain desirable performance.

Therefore, there exists a need for an apparatus and method for detecting adjacent interference and determining its location.

SUMMARY

A method and apparatus are disclosed for determining the presence of adjacent channel interference. Received digital signals are processed to detect the existence of strong channels adjacent to the channel of interest and control signals may be generated based on the detection of strong adjacent channels. The control signals are then used to adjust the signal power of the received signals.

BRIEF DESCRIPTION OF THE DRAWINGS

A more detailed understanding of the disclosed method may be had from the following detailed description, given by way of example and to be understood in conjunction with the accompanying drawings wherein.

DETAILED DESCRIPTION

Although the features and elements are described in particular combinations, each feature or element can be used alone, without the other feature or elements, or in various combinations with or without other features and elements.

Figure 1:
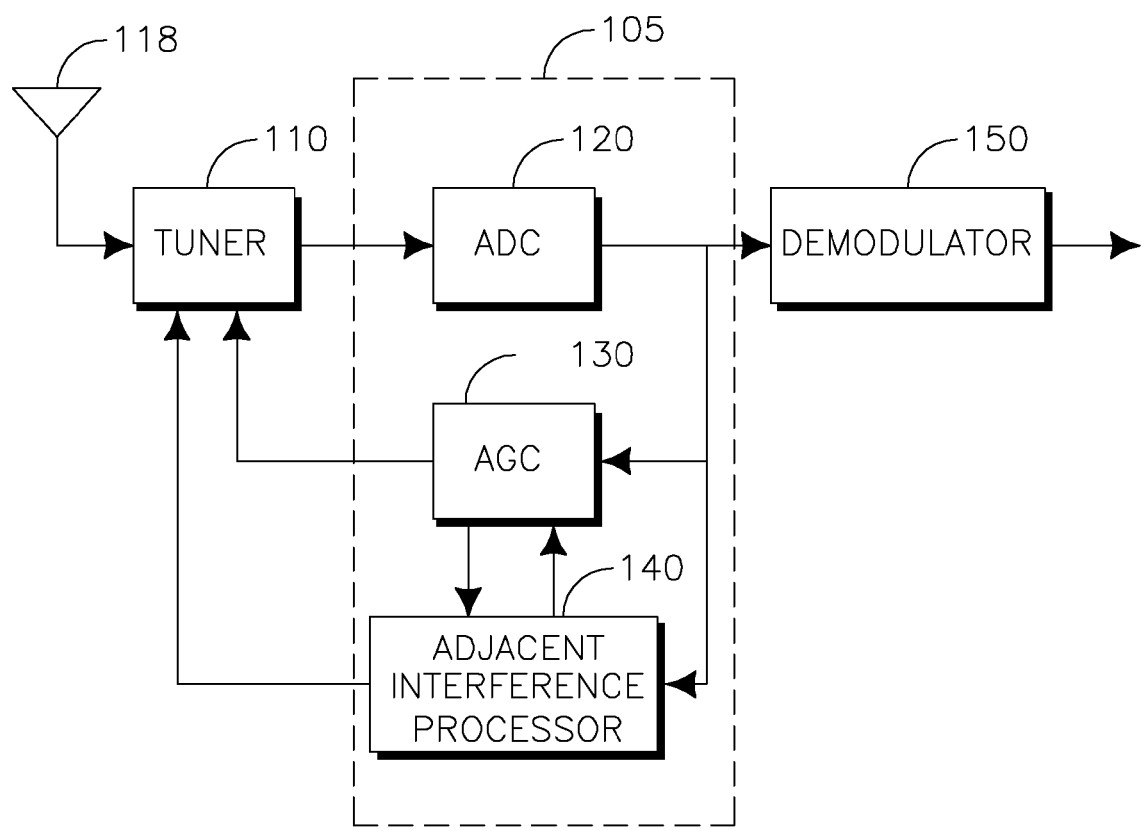
FIG. 1 is a receiver configured to implement a disclosed method of adjacent channel power scan.

FIG. 1 is a functional block diagram of a receiver 100 configured to implement a disclosed method of adjacent channel power scan and detection. Receiver 100 comprises a tuner 110, a tuner control module 105, (which includes an analog-to-digital converter (ADC) 120, an automatic gain control (AGC) 130, and an adjacent interference processor 140), a demodulator 150, and an antenna 118 to facilitate the transmission and reception of wireless data.

Receiver 100, receives digital TV signals, for example, digital video broadcast hand-held (DVB-H) signals, over the UHF band through tuner 110, (e.g., 470 MHz). Tuner 110, coupled to antenna 118, ADC 120, AGC 130 and processor 140, may be tuned to receive a certain band of wireless signals, including digital TV signals. Tuner 110, using control signals from processor 140 and gain information from 130, (to be disclosed hereinafter), then filters and converts the received signals to analog baseband signals I and Q and forwards the converted signals to ADC 120. ADC 120 translates the analog signals from tuner 110 into discrete digital signals. Once translated, these digital signals are sent by ADC 120 to demodulator 150, AGC 130 and processor 140.

AGC 130 uses the received signals from ADC 120 to determine the gain needed to assist in adjusting the signal level of the output of tuner 110. The gain information generated by AGC 130 is then forwarded to processor 140 and tuner 110.

Processor 140 receives the outputs of ADC 120 and AGC 130. Using the output signals of ADC 120 for several consecutive channels and the gain information from AGC 130, processor 140 determines the existence of strong channels adjacent to the channel of interest. This determination by processor 140 is made using the detected channel power of the adjacent channels. Based on the knowledge of the adjacent channel power, control signals are sent by processor 140 to AGC 130 and tuner 110. The processor control signals may indicate a frequency band tuner 110 should tune to, or an offset of a current channel that tuner 110 is tuned to. As such, the control signals from processor 140 are used by AGC 130 and tuner 110 to adjust the signal level of the output of tuner 110 by adjusting the frequency for which tuner 110 is tuned.

In accordance with the disclosed method, adjacent channels are identified by processor 140 using the Equation (1) below:

$$f_c + m\Delta f \qquad \text{Equation (1)}$$

where $f_c$ is the carrier frequency of the desired TV signal, $\Delta f$ is the bandwidth of the TV signal and m=0, ±1, ±2, . . . Processor 140 therefore, measures the signal power, $P(f_c + m\Delta f)$, of the identified adjacent bandwidths. The measured signal power is then compared to a threshold $P_{th}$. If $P(f_c \pm m\Delta f) > P(f_c) + P_{th}$, processor 140 determines that adjacent interference is present. It should be noted that the threshold $P_{th}$ may be predetermined, determined through testing, determined by the processor 140 or included in a message received from the network by receiver 100. It should also be noted that different tuners might have different thresholds depending on the tuner specifications.

Demodulator 150, coupled to ADC 120, receives the digital signals from ADC 120, obtains transport streams and outputs the transport streams to a low pass filter.

Figure 2:
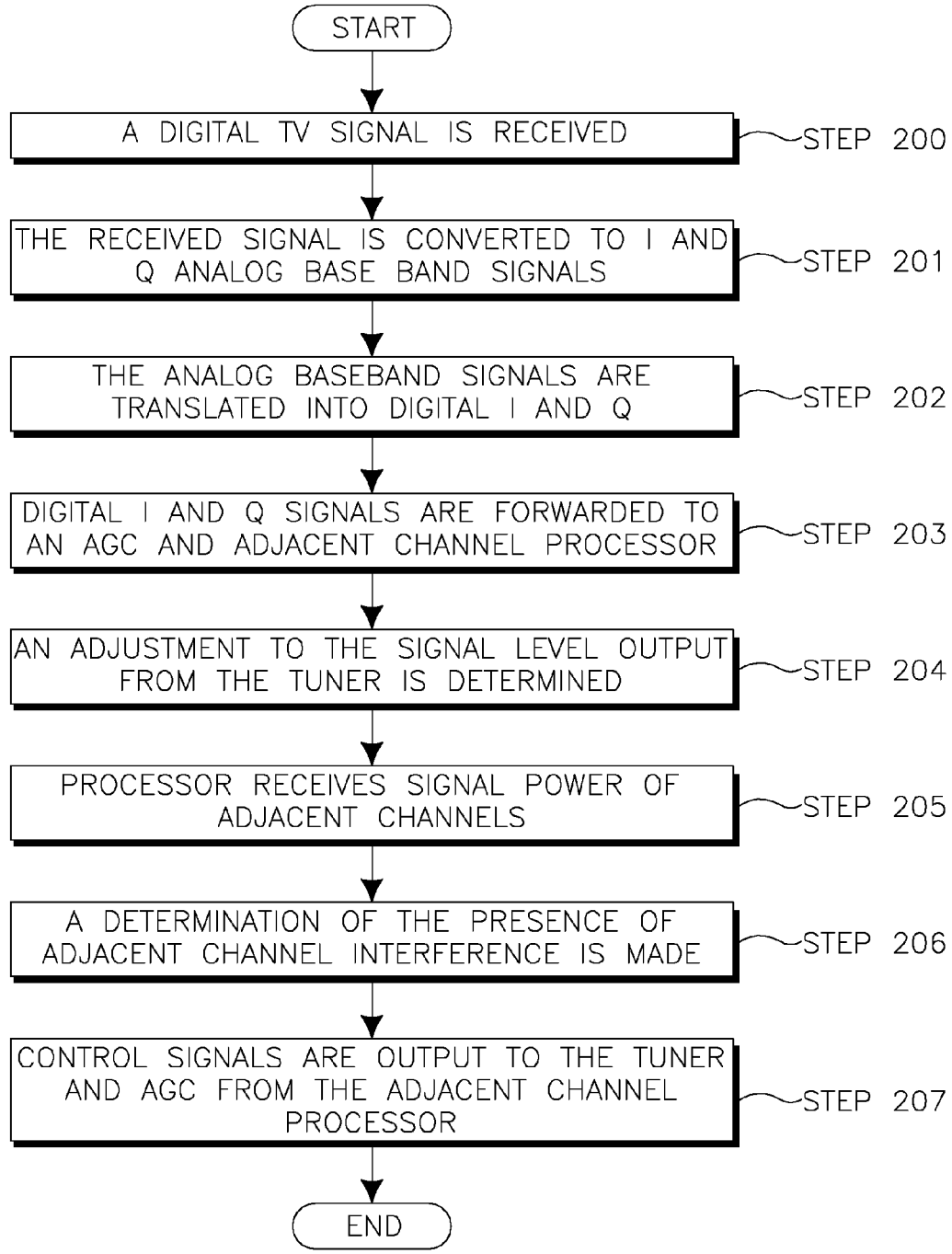
FIG. 2 is a flow diagram of the detection of adjacent channel interference in accordance with the disclosed method.

A flow diagram of the disclosed method of determining the presence of adjacent interference using tuner control module 105 is shown in FIG. 2. A receiver 100 receives a digital TV signal at antenna 118 and forwards the signal to tuner 110 (step 200). At tuner 110, the received signal is converted to I and Q analog baseband signals (step 201) and forwarded to ADC 120. ADC 120 then translates the analog baseband signals into digital I and Q (step 202). The digital I and Q signals are then forwarded to AGC 130 and adjacent channel processor 140 (step 203). At AGC 130, an adjustment to the signal level output from tuner 110 is determined (step 204). Using the information from AGC 130 and ADC 120, processor 140 measures the signal power of adjacent channels (step 205) and determines if there is adjacent channel interference (step 206). Processor 140 then outputs control signals, e.g., a frequency band, to tuner 110 and AGC 130 to assist in controlling the output of tuner 110 and AGC 130, respectively (step 207).

Figure 3:
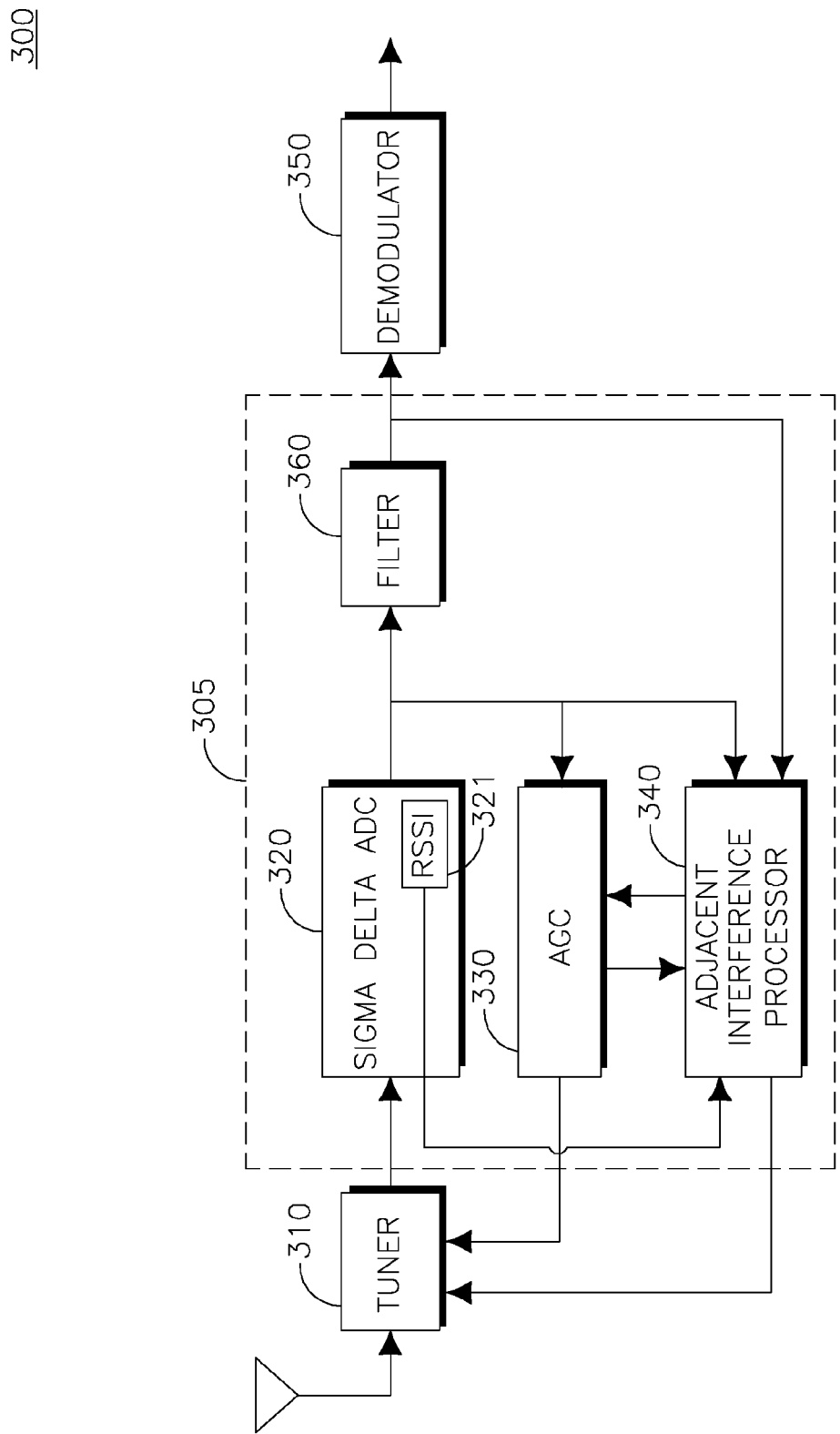
FIG. 3 is a implementation of a receiver configured to implement the disclosed method.

FIG. 3 shows an example implementation of a receiver 300 configured to implement the disclosed method of adjacent channel interference detection and zoom. Receiver 300 comprises a tuner 310, a tuner control module 305, and a demodulator 350. The tuner control module 305 includes an ADC 320, (for example, a Sigma Delta ADC), an AGC 330, an adjacent interference processor 340, and a filter 360.

As described with respect to receiver 100 hereinbefore, tuner 310 in receiver 300 receives digital TV signals, including a certain band of signals, and forwards the analog base band signals to ADC 320. ADC 320, comprising a Receive Signal Strength Indicator (RSSI) 321, coverts the analog baseband signals to digital signals. RSSI 321 coupled directly to processor 340, determines the signal strength of any adjacent channels present in the received signal. The signal strength is then forwarded directly to processor 340 by RSSI 321, as well as the digital signals from ADC 320.

Filter 360 extracts a signal of interest from the signals received from ADC 320. The adjacent signal of interest may be a particular adjacent channel or plurality of adjacent channels, or the channel of interest to receiver 300. The filtered target signal is then forwarded by filter 360 to processor 340 and demodulator 350. It should be noted that filter 360 is an optional component in receiver 300. Filter 360 may also be included in ADC 320.

Processor 340, using the filtered signal from filter 360, compares the digital signals received from ADC 320. This information is then used as another input filtered signal to the processor 340 to use to generate the control signals forwarded to tuner 310 and AGC 330.

Receiver 300 may be tuned to different bands to measure power of each signal. This can be done by receiver 300 whether or not ADC 320 is a Sigma Delta ADC. Those having skill in the art would recognize that a typical Sigma delta ADC structure is divided into two blocks. The first block samples the data with a feedback loop at a high sampling rate. The feedback loop has to shape the noise toward high frequencies. The second block, fed by the sampler, comprises a low pass filter to remove the pulse shaped noise.

Sigma delta ADCs operate on a channel bandwidth which is much larger than the desired TV band. As such, metrics can be inserted in between these two blocks to measure the signal power in regions adjacent to the desired signal. By comparing this to the input signal without adjacent interference, the required gain needed to be forwarded to the tuner to minimize the effect of the adjacent signals can be calculated. This results in overloading the ADC (i.e., increasing of the signal power). Since the interference of the adjacent bands is partially filtered by the sigma delta ADC, increasing the signal gain results in a better signal to adjacent interference ratio. Without this additional correction, the measured power used by the AGC is integrated over the whole bandwidth used by the sigma-delta ADC, which translates the AGC compensation into a compression of the signal coming from the tuner. (This is desired when there are no adjacent signals.)

Recalibration of tuners 110, 310 is preferably done upon detection of movement of receivers 100, 300. When the receiver is in motion there are a set of algorithms that may be instantiated to mitigate for specific types of interferences introduced by the fact the receiver is motion with respect to a transmitter. For example, impairments (such as Doppler effects), must be compensated for, as should multipath signal distortions (i.e., bouncing echoes) which are time varying. Adjacent signal compensation then must detect adjacent channel variations over time, and apply the correction/recalibrations to the tuner when it is needed. Corrections for impairments, and multipath signal distortions, as examples, continuously compensate for the distortion. For adjacent signals, compensation for motion is often translated into detection of movement of the receiver, and a quantification of the energy produced by other RF emitters (such as other towers) in a given location. The recalibration, therefore, may be required when the receiver is in the fringe of a cell, where weak signal reception typically gets overloaded by undesired signals. As those having skill in the art know, there are several techniques to detect if the receiver is moving and several algorithms to estimate the speed of the receiver using the structure of the signal distortions.

Figure 4:
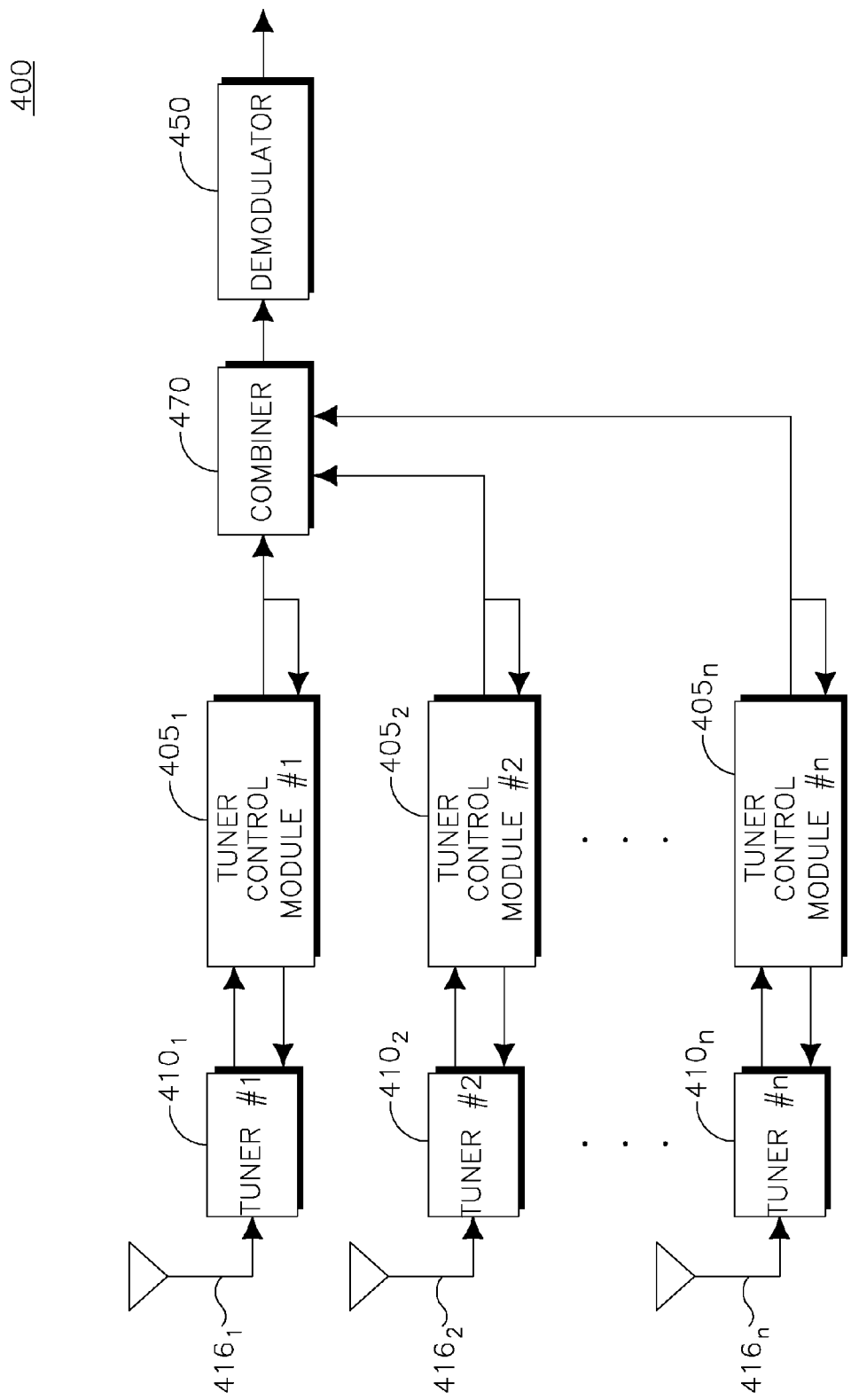
FIG. 4 is a continuous reception multi-antenna based receiver configured to implement the disclosed method.

FIG. 4 shows an example of a receiver 400 that receives a continuous stream that cannot be interrupted. In accordance with this disclosed apparatus, receiver 400, configured to implement adjacent interference detection, comprises a plurality of antennas $416_1$, . . . $416n$, a plurality of tuners $410_1$, . . . $410n$, a plurality of tuner control modules $405_1$, . . . $405n$, a combiner 470 and a demodulator 450. Receiver 400 allows the reception of the continuous stream and the adjustment of the addressing signals without disrupting reception. As indicated in the examples shown in FIGS. 1 and 3, adjustment of the address signals is made upon detection of movement by the receiver and after data transfer is complete.

In accordance with disclosed receiver 400, a single antenna, for example, antenna $416_1$, may be used for continuous reception. It is preferable that the antenna providing continuous reception be the antenna that provides the best reception. One or more of the remaining antennas, e.g., $416_2$ . . . $416_n$, receive a channel of interest and for determining whether there is present any energy that is associated with the received channel, (i.e., interference).

As an example, antenna $416_2$ will be used to detect an adjacent channel of interest and determine its power level and provide this information to combiner 470. This information is also provided by antenna $416n$ except that the power level may be less due to how the antennas are configured on receiver 400, (e.g., polarity, directional, omni-directional, etc.).

For continuous signal based receivers, receiver 400, including multiple antennas $416_1$ . . . $416n$ and multiple tuner control modules $405_1$ . . . $405n$, may be used. As described hereinbefore, when movement of the receiver has been detected, at least one of the plurality of tuners $410_1$ . . . $410n$, for example $410_1$, continues to receive the continuous signal while one or more of the other antennas $416_2$ . . . $416_n$ and tuners $410_2$ . . . $410_n$ detect the adjacent interference and recalibrate the tuners, thereby avoiding any disruption in receiving the continuous signal.

Figure 5:
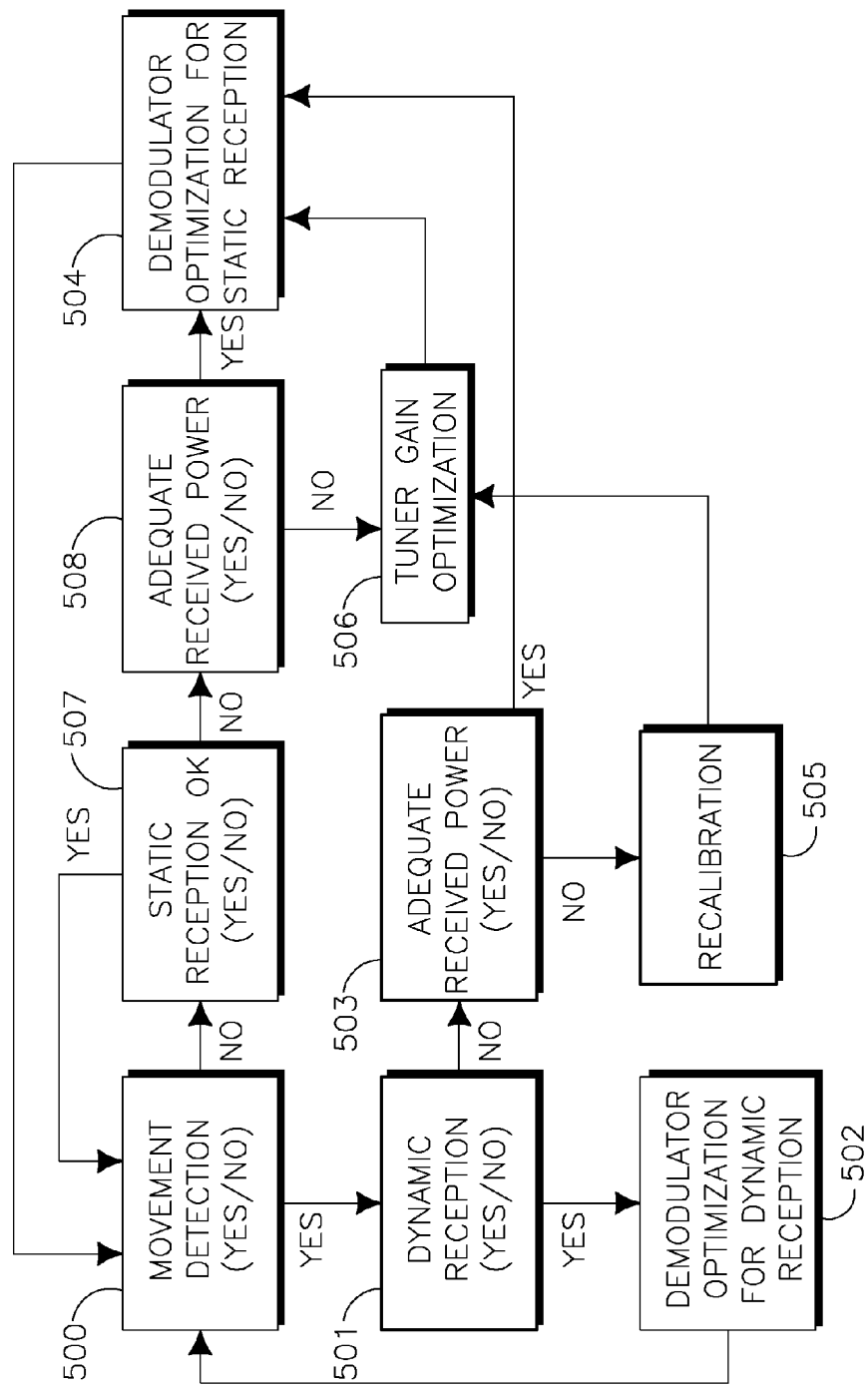
FIG. 5 is a flow diagram of a disclosed method for recalibrating a tuner.

FIG. 5 shows an example flow diagram of the disclosed method 510 of operation of a receiver. A determination is made as to whether the receiver is in motion and therefore needs to be recalibrated, (step 500). Recalibration in continuous reception receivers, occurs without disrupting reception. Therefore, when it is determined that the receiver is in motion, another determination is made as to whether the receiver is in a dynamic reception scenario, (step 501). When in a dynamic scenario, the demodulator is optimized using certain metrics for dynamic reception, (step 502), (e.g., a mobile phone that is moving in a car or train versus moving with a pedestrian).

When dynamic reception is not present, a determination is made as to whether recalibration is necessary, (step 503). This determination can be made by determining whether the received address signal has adequate received power. If there is adequate power, the demodulator is optimized for static reception, (step 504), otherwise, recalibration of the receiver is performed using the disclosed adjacent channel processor, (step 505).

Once the adjacent channel processor has determined the presence of adjacent channel interference, the tuner is optimized, (step 506), then, the demodulator optimized for static reception, considering any detected adjacent interference, (step 507).

In the event movement is not detected, a determination of whether static reception is sufficient, (step 508). If static reception is not sufficient, the adequacy of the received signal power is determined, (step 509). If it is determined that the received signal is not received with adequate power, a tuner gain is optimized (step 510) and, then the demodulator is optimized for static reception, (step 511).

If adequate power is detected for the received signal, the demodulator is optimized for static reception, (step 512).

In an alternative disclosed method, processor 140 can output control signals to tune tuner 110 to an adjacent channel prior to tuning tuner 110 to the desired carrier frequency to detect adjacent interference signals. For example, instead of tuning the tuner 110 to a frequency N, the carrier frequency of the desired signal, tuner 110 can be tuned to N±1, N±2, N±3 and N±4. Upon tuning the tuner 110 to these requirements, processor 140 determines whether there is adjacent interference for the respective frequency.

Adjacent interference that is further away is easier to deal with. Therefore, different tuner settings and AGC algorithms can be activated by processor 140 to mitigate this interference, depending on where the major adjacent interference is located.

The disclosed adjacent power scan can be performed periodically during the off period in DVB-H mode, in case the received signal properties have been changed. It also reduces the receiver power-on time, since it does not need to scan adjacent channels every time a new burst is received. The disclosed method also assists in frequency scan and handover. In frequency scan, the receiver tunes to more than 40 channels in the UHF band. If the signal power is too low, it can be determined that no DVB-T/H signal exists in that specific channel, which provides some information to the adjacent interference processor. As a result, frequency scan may not need to scan all TV channels by skipping those low power channels.

Although features and elements are described above in particular combinations, each feature or element can be used alone without the other features and elements or in various combinations with or without other features and elements.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAS) circuits, any other type of integrated circuit (IC), and/or a state machine.

The invention claimed is:

1. A method for determining the presence of adjacent channel interference comprising:
    receiving a signal on a first antenna coupled to a first tuner and a second antenna coupled to a second tuner, the first antenna and first tuner receiving the signal continuously, the received signal including a channel of interest;
    converting the received signal of the second tuner to a discrete digital signal;
    processing the digital signal by the processor and the second tuner to detect an adjacent channel interference by:
        measuring the signal power of at least one channel adjacent to the channel of interest; and
        determining the adjacent channel interference as a measured signal power of the at least one channel adjacent to the channel of interest that is greater than a predetermined threshold; and
    generating a control signal based at least on the detection of the at least one adjacent channel, the control signal used to filter out the adjacent channel interference, adjust the signal power of the channel of interest, and adjust the frequency to which the first tuner is tuned;
wherein the first tuner is recalibrated for the adjacent channel interference without disruption in receiving the continuous signal by the first antenna and the first tuner during the processing by the processor and the second tuner.

2. The method of claim 1, wherein the received signal is a digital TV signal, further comprising the second tuner converting the received signal to a baseband signal, which is converted to the discrete digital signal.

3. The method of claim 1, wherein the measuring the signal power of at least one channel adjacent to the channel of interest is measured in accordance with the following equation for a measured power value P:

$$P=P(f_c+m\Delta f)$$

where $f_c$ is the carrier frequency of the channel of interest; $\Delta f$ is the bandwidth of the received signal; and $m=0, \pm1, \pm2$.

4. The method of claim 3, wherein adjacent channel interference is detected when $$P(f_c \pm m\Delta f) > P(f_c) + P_{th}$$

for the adjacent channel $f_c \pm m\Delta f$, where $P_{th}$ is the predetermined threshold.

5. The method of claim 1, further comprising:
    determining a signal strength indicator for each channel included in the received channel.

6. The method of claim 5, wherein at least the signal strength indicator and the comparison of each signal power to the threshold $P_{th}$ are used to detect the existence of adjacent channel interference.

7. The method of claim 1, further including filtering the discrete signal by extracting an adjacent channel of interest; and comparing the digital signal to the filtered digital signal.

8. The method of claim 7, wherein at least the signal strength indicator and the comparison of each signal power to the threshold $P_{th}$ are used to detect the existence of adjacent channel interference.

9. The method of claim 8, wherein the comparison of the digital signal to the filtered digital signal are used to detect the existence of adjacent channel interference.

10. A receiver comprising:
- a first antenna coupled to a first tuner configured to receive a signal, the received signal including a channel of interest, wherein the first antenna and the first tuner receive the signal continuously;
- a second antenna coupled to a second tuner configured to receive the signal;
- an analog to digital convertor (ADC) for converting the received signal of the second tuner to a discrete digital signal;
- a processor configured to process the digital signal using the second tuner to detect an adjacent channel interference by:
  - measuring the signal power of at least one channel adjacent to the channel of interest; and
  - determining the adjacent channel interference as a measured signal power of the at least one channel adjacent to the channel of interest that is greater than a predetermined threshold; and
- a generator configured to generate a control signal based at least on the detection of the at least one adjacent channel, the control signal used to filter out the adjacent channel interference, adjust the signal power of the channel of interest, and adjust the frequency to which the first tuner is tuned;

wherein the first tuner is recalibrated for the adjacent channel interference without disruption in receiving the continuous signal during the processing by the processor and the second tuner.

11. The receiver of claim 10, wherein the received signal is a digital TV signal, wherein the second tuner is configured to convert the received signal to a baseband signal, and wherein the ADC is configured to convert the baseband signal to the discrete digital signal.

12. The receiver of claim 10, wherein the ADC includes a received signal strength indicator (RSSI) for determining a signal strength indicator for each channel included in the received signal.

13. The receiver of claim 12, wherein the processor uses at least the signal strength indicator and the comparison of each signal power to the threshold to detect the existence of adjacent channel interference.

14. The receiver of claim 10, further comprising a filter for filtering the discrete signal by extracting an adjacent channel of interest.

15. A non-transitory computer readable storage medium storing a set of instructions for execution by a processor that when executed, perform the following method:
- selecting a first antenna and a first tuner to receiving a signal continuously, the received signal including a channel of interest;
- selecting a second antenna and a second tuner for receiving the signal;
- a digital signal conversion code segment for converting the received signal of the second tuner to a discrete digital signal;
- a digital signal processing code segment for processing the digital signal to detect an adjacent channel interference by:
  - measuring the signal power of at least one channel adjacent to the channel of interest; and
  - determining the adjacent channel interference as a measured signal power of the at least one channel adjacent to the channel of interest that is greater than a predetermined threshold; and
- a control signal generating code segment for generating control signals based at least on the detection of the at least one adjacent channel, the control signal used to filter out the adjacent channel interference, adjust the signal power of the channel of interest, and adjust the frequency to which the first tuner is tuned; and
- a recalibration code segment for recalibrating the first tuner for the adjacent channel interference without disruption in receiving the continuous signal by the first antenna and the first tuner during the processing by the processor and the second tuner.

16. The method of claim 1, further comprising:
- detecting movement of a receiver comprising the first antenna, the first tuner, the second antenna and the second tuner, wherein the second tuner is recalibrated for the adjacent channel interference in response to the detection of the movement of the receiver.

\* \* \* \* \*